United States Patent
Iwata et al.

(10) Patent No.: US 10,848,917 B2
(45) Date of Patent: Nov. 24, 2020

(54) SERVER DEVICE, OCCUPANT DETERMINATION METHOD, AND OCCUPANT DETERMINATION SUPPORT METHOD

(71) Applicant: Clarion Co., Ltd., Saitama (JP)

(72) Inventors: Yumi Iwata, Saitama (JP); Takashi Yamaguchi, Saitama (JP); Hiroe Ushio, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 16/456,017

(22) Filed: Jun. 28, 2019

(65) Prior Publication Data
US 2020/0029188 A1   Jan. 23, 2020

(30) Foreign Application Priority Data

Jul. 23, 2018   (JP) ................. 2018-137596

(51) Int. Cl.
*H04W 4/029*   (2018.01)
*H04W 4/42*    (2018.01)
*H04W 4/00*    (2018.01)

(52) U.S. Cl.
CPC ............. *H04W 4/029* (2018.02); *H04W 4/00* (2013.01); *H04W 4/42* (2018.02)

(58) Field of Classification Search
CPC .......... G06Q 50/30; G06Q 20/12; G05D 1/00; G05D 1/0016; G05D 1/0022; G05D 1/0027; G05D 1/0088; G05D 1/12; G08G 1/00; G08G 1/127; G08G 1/202; B60W 30/00; B60W 30/06; H04W 4/00; H04W 4/026;

(Continued)

(56) References Cited

U.S. PATENT DOCUMENTS

2012/0295576 A1   11/2012  Peterson
2015/0161554 A1*   6/2015  Sweeney ........ G06Q 10/063114
                                               705/7.15

(Continued)

FOREIGN PATENT DOCUMENTS

| GB | 2534273 A      | 7/2016 |
|----|----------------|--------|
| JP | 2008-203821 A  | 9/2008 |
| WO | WO 2016/078476 A1 | 5/2016 |

OTHER PUBLICATIONS

Extended European Search Report issued in counterpart European Application No. 19186723.3 dated Dec. 19, 2019 (eight pages).

*Primary Examiner* — Van T Trieu
(74) *Attorney, Agent, or Firm* — Crowell & Moring LLP

(57) ABSTRACT

An object is to provide a server device, an occupant determination method, and an occupant determination support method that efficiently manages an occupant to be associated with a vehicle. A server device includes an on-board device information acquisition unit configured to acquire position information from an on-board device, a terminal request unit configured to transmit, to a plurality of predetermined terminal devices, information indicating a riding determination request including the position information of the on-board device, and an occupant determination unit configured to associate at least one terminal device out of the plurality of predetermined terminal devices and the on-board device with each other, based on a response from the terminal device that is present within a predetermined distance from the on-board device.

17 Claims, 11 Drawing Sheets

(58) Field of Classification Search
CPC ......... H04W 4/029; H04W 4/06; H04W 4/42;
H04W 4/44; H04W 4/48; H04W 4/80
See application file for complete search history.

(56) References Cited

U.S. PATENT DOCUMENTS

2015/0339923 A1* 11/2015 Konig .................... G08G 1/202
701/522
2017/0357258 A1* 12/2017 Schwie .................. G06Q 10/00

* cited by examiner

FIG. 2

TERMINAL INFORMATION 121

| TERMINAL IDENTIFIER | POSSESSOR INFORMATION |
|---|---|
| ***** | ***** |
| ***** | ***** |
| ***** | ***** |
| ⋮ | ⋮ |

FIG. 3

OCCUPANT INFORMATION 122

| TIME | ON-BOARD DEVICE IDENTIFIER | TERMINAL IDENTIFIER | POSSESSOR INFORMATION |
|------|---------------------------|---------------------|----------------------|
| ***** | ***** | ***** | ***** |
| ***** | ***** | ***** | ***** |
| ***** | ***** | ***** | ***** |
| ⋮ | ⋮ | ⋮ | ⋮ | under the Japanese Patent Application No. 2018-137596 filed on Jul. 23, 2018.

SERVER DEVICE, OCCUPANT DETERMINATION METHOD, AND OCCUPANT DETERMINATION SUPPORT METHOD

CLAIM OF PRIORITY

This application claims the priority based on the Japanese Patent Application No. 2018-137596 filed on Jul. 23, 2018. The entire contents of which are incorporated herein by reference for all purpose.

BACKGROUND

Technical Field

The present invention relates to a server device, an occupant determination method, and an occupant determination support method.

Background Art

There has been a technique of performing short-range communication between equipment installed in a vehicle and a terminal device.

Japanese Patent Laid-open Publication No. 2008-203821A discloses a technique relating to a vehicle data provision device. Japanese Patent Laid-open Publication No. 2008-203821A describes that, in paragraph [0023], "a vehicle data provision ECU 10 includes a short-range communication module 18, and when an occupant brings an information terminal 40a inside a vehicle, the vehicle data provision ECU 10 can directly communicate with the information terminal 40a via the short-range communication module 18." Further, Japanese Patent Laid-open Publication No. 2008-203821A describes, in paragraph [0038], "in Step S250, a response signal in response to regular communication from the vehicle data provision ECU 10 is transmitted. In this manner, the vehicle data provision ECU 10 confirms that the information terminal 40 is present inside the vehicle, and continues a record of the vehicle data."

SUMMARY

According to the vehicle data provision device described in Japanese Patent Laid-open Publication No. 2008-203821A, the vehicle data provision ECU and the information terminal are connected with short-range communication for storing an occupant riding record in a riding record DB. However, the connection with short-range communication requires many procedures, such as acknowledges of signals and pairing, and accordingly imposes a heavy load on an on-board device and the information terminal.

The present invention is made in view of the problem described above, and has an object to provide a server device, an occupant determination method, and an occupant determination support method that efficiently manage an occupant to a vehicle.

Solution to Problem

The present application includes a plurality of solutions to the above-mentioned problem. One example of the solutions is as follows.

To solve the problem described above, a server device according to the present invention includes an on-board device information acquisition unit configured to acquire position information from an on-board device, a terminal request unit configured to transmit, to a plurality of predetermined terminal devices, information indicating a riding determination request including the position information of the on-board device, and an occupant determination unit configured to associate at least one terminal device out of the plurality of predetermined terminal devices and the on-board device with each other, based on a response from the terminal device that is present within a predetermined distance from the on-board device.

According to the present invention, a server device, an occupant determination method, and an occupant determination support method that efficiently manage an occupant to a vehicle can be provided.

A problem, configuration, and effect other than those described in the above will be apparent from the description of embodiments given below.

BRIEF DESCRIPTION OF DRAWINGS

FIG. 2 is a diagram illustrating an example of a data structure of terminal information.

FIG. 3 is a diagram illustrating an example of a data structure of occupant information.

DESCRIPTION OF EMBODIMENTS

First Embodiment

Figure 1:
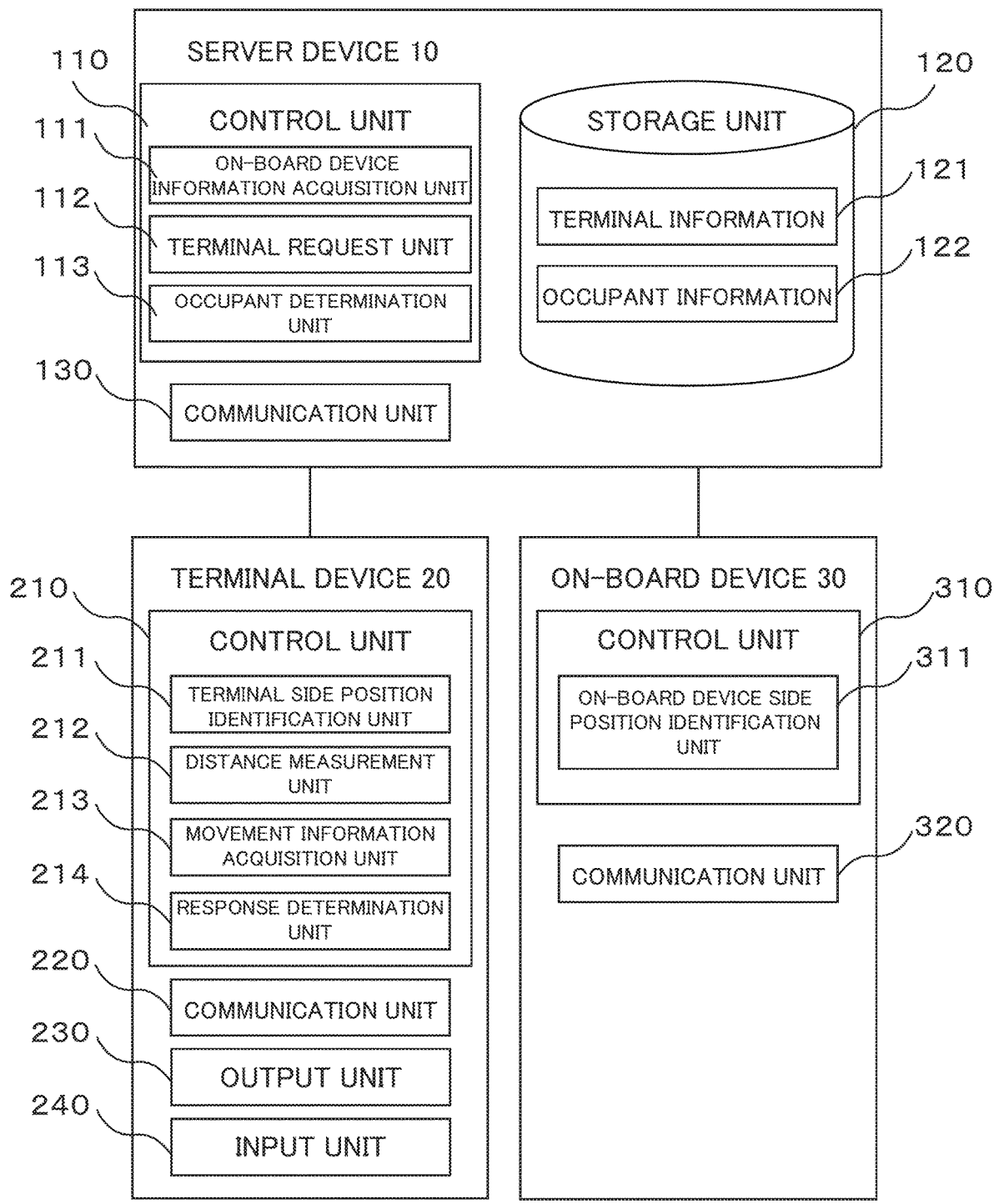
FIG. 1 is a diagram illustrating an example of a functional block configuration of an occupant determination system according to a first embodiment.

Examples of embodiments of the present invention will be described below with reference to the drawings. FIG. 1 is a diagram illustrating an example of a functional block configuration of an occupant determination system 1 according to a first embodiment. The occupant determination system 1 includes a server device 10, at least one terminal device 20, and at least one on-board device 30. The server device 10 is communicably connected to one or more terminal devices 20 and one or more on-board devices 30.

The server device 10 is an information processing device such as a server computer or a personal computer (PC), and is operated by a provider of a vehicle management service using the occupant determination system 1, for example.

The description is given below by taking an example in which the vehicle management service manages a plurality of vehicles possessed by a carrier.

The terminal device 20 is a portable information processing terminal such as a PC, a smartphone, a feature phone, a personal digital assistant (PDA), a laptop computer, or a tablet terminal. For example, the terminal device 20 is possessed by a person to be provided with the vehicle management service. As one example, the terminal device 20 is possessed by an employee of a carrier, such as an occupant of a vehicle.

The on-board device 30 is a computer device installed in a vehicle. The on-board device 30 may be a part of a navigation device that provides route information to the occupant. The on-board device 30 according to this embodiment supposes an information processing device that can operate on its own. However, for example, the on-board device 30 may be various controllers or the like embedded in a movable body such as a vehicle.

The server device 10 includes a control unit 110, a storage unit 120, and a communication unit 130. The control unit 110 generally controls the entire server device 10. The storage unit 120 stores information used for processing that is performed by the control unit 110. The communication unit 130 transmits and receives information to and from the terminal device 20 and the on-board device 30.

The control unit 110 includes an on-board device information acquisition unit 111, a terminal request unit 112, and an occupant determination unit 113. The on-board device information acquisition unit 111 acquires on-board device information. The on-board device information includes position information indicating a position of the on-board device 30, and information indicating determination time of the position information. For example, the on-board device information acquisition unit 111 acquires the on-board device information when the on-board device 30 is turned on. Further, when the occupant determination unit 113 (described later) receives responses from a plurality of terminal devices 20, the on-board device information acquisition unit 111 re-acquires on-board device information from the on-board device 30.

The terminal request unit 112 transmits information indicating a riding determination request to a plurality of predetermined terminal devices 20. The information indicating a riding determination request includes an identifier of the on-board device 30, the position information of the on-board device 30, and information indicating the determination time of the position information. When the on-board device 30 is turned on, the terminal request unit 112 submits a riding determination request to each of the terminal devices 20 to be managed. Further, when the occupant determination unit 113 (described later) receives responses from a plurality of terminal devices 20, the terminal request unit 112 submits a riding determination request to each of the plurality of terminal devices 20 that transmitted the responses, after the elapse of a predetermined time period since the last riding determination request.

Further, when the occupant determination unit 113 receives responses a predetermined number of times from a plurality of terminal devices 20, the terminal request unit 112 transmits information indicating riding confirmation to the plurality of terminal devices 20 that responded to the riding determination request submitted at the latest timing.

Based on a response from a terminal device 20 that is present within a predetermined distance from the on-board device 30, the occupant determination unit 113 associates the terminal device 20 and the on-board device 30 with each other to generate occupant information 122 (described later). More specifically, when the occupant determination unit 113 receives a response from a terminal device 20 that is one terminal device 20 present within a predetermined distance from the on-board device 30 and that is moving at predetermined time specified by using the determination time of the position information of the on-board device 30, the occupant determination unit 113 associates the on-board device 30 and the terminal device 20 with each other to generate the occupant information 122. The above-mentioned one terminal device 20 determined by the occupant determination unit 113 is regarded as the terminal device 20 possessed by a driver of a vehicle. In other words, it can be said that the occupant determination unit 113 associates a driver with a vehicle.

Further, when there is a response to the information indicating riding confirmation transmitted from the terminal request unit 112 in a predetermined case, the occupant determination unit 113 associates the terminal device 20 and the on-board device 30 with each other, based on the response.

The storage unit 120 stores terminal information 121 and the occupant information 122. The terminal information 121 is information in which the terminal device 20 to be provided with the vehicle management service is associated with its possessor. The occupant information 122 is information in which the on-board device 30 is associated with the occupant. The occupant information 122 is generated in occupant determination processing according to this embodiment.

The terminal device 20 includes a control unit 210, a communication unit 220, an output unit 230, and an input unit 240. The control unit 210 generally controls the entire terminal device 20. The communication unit 220 transmits and receives information to and from the server device 10. The output unit 230 outputs information to an output device such as a display. The input unit 240 receives an input of information from the possessor via an input device such as a touch panel.

The control unit 210 includes a terminal side position identification unit 211, a distance measurement unit 212, a movement information acquisition unit 213, and a response determination unit 214. The terminal side position identification unit 211 identifies the present position of the terminal device 20, by using a positioning signal reception device 254 (described later). The distance measurement unit 212 measures a distance between the on-board device 30 and the terminal device 20, by using the position information of the on-board device 30 received from the server device 10 and position information of the terminal device 20.

The movement information acquisition unit 213 acquires movement information indicating whether or not the terminal device 20 is moving, by using a motion sensor 259 (described later). For example, when an acceleration sensor is used as the motion sensor 259, the movement information acquisition unit 213 acquires acceleration as the movement information. The movement information acquired by the movement information acquisition unit 213 is not limited to acceleration. For example, the movement information may be angular velocity. The description is given below by taking an example in which the movement information acquisition unit 213 acquires acceleration as the movement information.

When the response determination unit 214 receives information indicating a riding determination request from the server device 10, the response determination unit 214 determines whether or not the terminal device 20 is moving at a timing that is a predetermined time period before the determination time of the position information of the on-board device 30. The response determination unit 214 determines whether or not the terminal device 20 is moving, by using the movement information acquired by the movement information acquisition unit 213. As one example, when the acceleration acquired by the movement information acquisition unit 213 satisfies a predetermined condition (for example, the acceleration is equal to or greater than a predetermined value), the response determination unit 214 determines that the terminal device 20 is moving.

When the distance between the terminal device 20 and the on-board device 30 is within a predetermined distance and the terminal device 20 is moving, the response determination unit 214 transmits a response to the server device 10 via the communication unit 220. In this example, when the distance between the terminal device 20 and the on-board device 30 exceeds a predetermined distance or when it is not determined that the terminal device 20 is moving, the response determination unit 214 does not transmit a response to the server device 10.

Note that, even when the distance between the terminal device 20 and the on-board device 30 exceeds a predetermined distance or when it is not determined that the terminal device 20 is moving, the response determination unit 214 may transmit a response to the server device 10. In such a case, the response includes information for determining whether or not a condition is satisfied. The condition is that the distance between the terminal device 20 and the on-board device 30 is within a predetermined distance, and that the terminal device 20 is moving.

The on-board device 30 includes a control unit 310 and a communication unit 320. The control unit 310 integrally controls the entire on-board device 30. The communication unit 320 transmits and receives information to and from the server device 10. The control unit 310 includes an on-board device side position identification unit 311.

The on-board device side position identification unit 311 identifies the position of the on-board device 30, by using a positioning signal reception device 354 (described later) included in the on-board device 30.

FIG. 2 is a diagram illustrating an example of a data structure of the terminal information 121. The terminal information 121 includes a terminal identifier and possessor information. The terminal identifier is identification information for identifying the terminal device 20 to be provided with the vehicle management service. The possessor information is identification information for identifying a person (possessor) possessing the terminal device 20.

FIG. 3 is a diagram illustrating an example of a data structure of the occupant information 122. The occupant information 122 is information generated in occupant determination processing. The occupant information 122 includes time, an on-board device identifier, a terminal identifier, and possessor information.

The time is information indicating time at which a record of the occupant information 122 is generated. The time may be information indicating the determination time of the position information of the on-board device 30 used to generate the record. Note that the information indicating the determination time is included in the on-board device information received from the on-board device 30 when the record of the occupant information 122 is generated.

The on-board device identifier is identification information for identifying the on-board device 30. The terminal identifier is identification information for identifying the terminal device 20. The possessor information is identification information for identifying a possessor of the terminal device 20. In this embodiment, the on-board device 30 at certain time is associated with one terminal device 20 and a possessor. This indicates that a driver possessing the terminal device 20 is riding on a vehicle including the on-board device 30.

Figure 4:
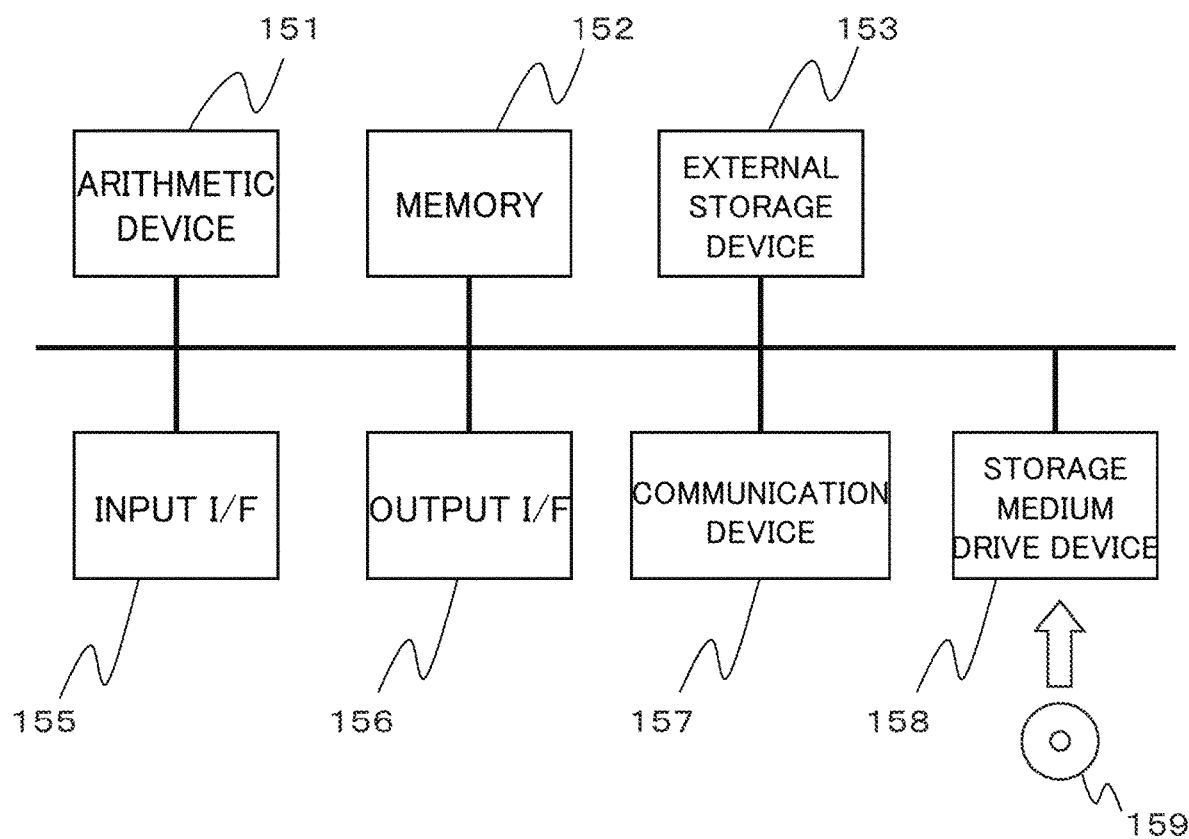
FIG. 4 is a diagram illustrating an example of a hardware configuration of a server device.

FIG. 4 is a diagram illustrating an example of a hardware configuration of the server device 10. The server device 10 includes an arithmetic device 151, a memory 152, an external storage device 153, an input interface (I/F) 155, an output I/F 156, a communication device 157, and a storage medium drive device 158. These components are connected to each other by a bus.

The arithmetic device 151 is a central arithmetic device, such as a central processing unit (CPU), and performs processing, according to a program recorded in the memory 152 or the external storage device 153. When the arithmetic device 151 performs the program, each processing unit included in the control unit 110 implements corresponding function.

The memory 152 is a storage device, such as random access memory (RAM), and functions as a storage area in which a program and data are temporarily read out. For example, the external storage device 153 is a writable and readable storage medium, such as a hard disk drive (HDD) or a flash memory.

The function of the storage unit 120 is implemented with the memory 152 or the external storage device 153. The function of the storage unit 120 may be implemented with a storage device on a network.

The input I/F 155 is an interface for connecting to an input device (not illustrated) that receives input operation from a user such as a driver. For example, the input I/F 155 receives an input from a touch panel, a microphone, or the like. The output I/F 156 is an interface for outputting information to an output device.

The communication device 157 is a device for connecting the server device 10 to a network. The function of the communication unit 130 is implemented with the communication device 157. The storage medium drive device 158 is a device that inputs and outputs information to and from a portable medium 159, such as a compact disk (CD) and a digital versatile disk (DVD).

Figure 5:
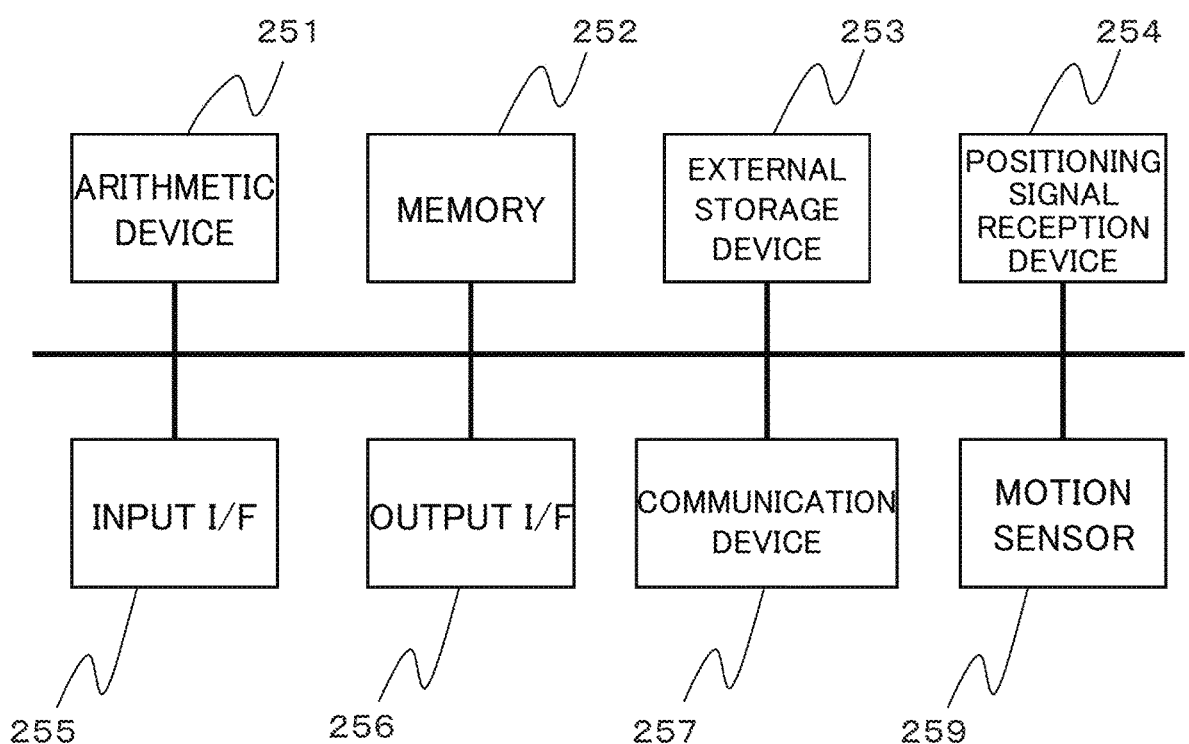
FIG. 5 is a diagram illustrating an example of a hardware configuration of a terminal device.

FIG. 5 is a diagram illustrating an example of a hardware configuration of the terminal device 20. The terminal device 20 includes an arithmetic device 251, a memory 252, an external storage device 253, a positioning signal reception device 254, an input I/F 255, an output I/F 256, a communication device 257, and a motion sensor 259. These components are connected to each other by a bus.

The arithmetic device 251 is similar to the arithmetic device 151, the memory 252 to the memory 152, the external storage device 253 to the external storage device 153, the input I/F 255 to the input I/F 155, the output I/F 256 to the output I/F 156, the communication device 257 to the communication device 157, and the storage medium drive device 258 to the storage medium drive device 158. Therefore, description of these components is omitted.

For example, the positioning signal reception device 254 receives signals from satellites, such as satellites of the Global Positioning System (GPS), and measures, for three or more satellites, a distance between a movable body and each satellite, and a change rate of each distance to obtain a present position, a traveling speed, and a traveling direction of the movable body. Note that the positioning signal reception device 254 may receive positioning signals from the Quasi-Zenith Satellite System or the like, which is used to calculate the present position with higher precision than the GPS satellites. The function of the terminal side position identification unit 211 is implemented with the positioning signal reception device 254.

The motion sensor 259 is a sensor that detects movement of the terminal device 20. For example, the motion sensor 259 is an acceleration sensor that detects vibration, gravity, and impact in three axes. The motion sensor 259 may further include a gyro sensor.

Figure 6:
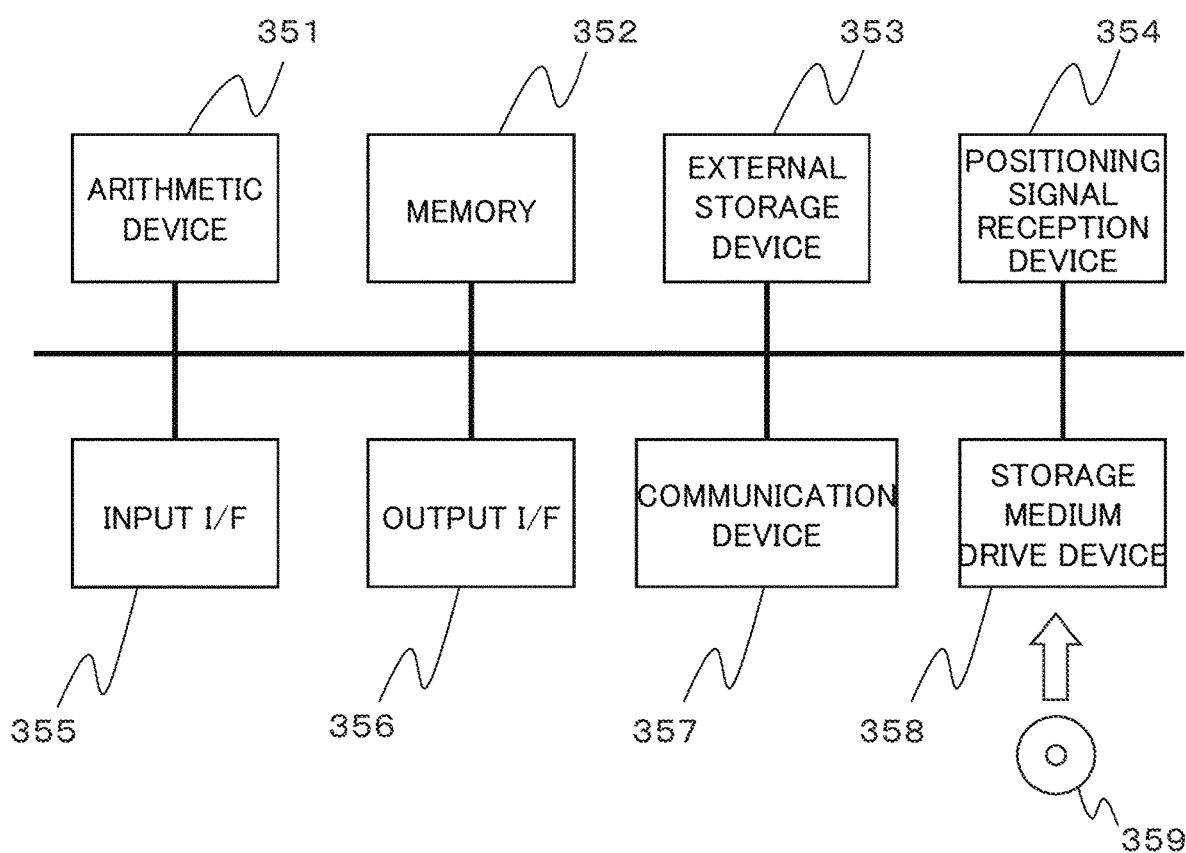
FIG. 6 is a diagram illustrating an example of a hardware configuration of an on-board device.

FIG. 6 is a diagram illustrating an example of a hardware configuration of the on-board device 30. The on-board device 30 includes an arithmetic device 351, a memory 352, an external storage device 353, a positioning signal reception device 354, an input I/F 355, an output I/F 356, a communication device 357, and a storage medium drive device 358. These components are connected to each other by a bus.

The arithmetic device 351 is similar to the arithmetic device 151, the memory 352 to the memory 152, the external storage device 353 to the external storage device 153, the positioning signal reception device 354 to the positioning signal reception device 254, the input I/F 355 to the input I/F 155, the output I/F 356 to the output I/F 156, the communication device 357 to the communication device 157, and the storage medium drive device 358 to the storage medium drive device 158. Therefore, description of these components is omitted.

Note that the on-board device 30 may include a communication device for connecting the on-board device 30 to a network within a vehicle, and to another vehicle device. As one example, the communication device is a communication device in conformity to a communication standard, such as a controller area network (CAN).

Note that processing of each of the components of the server device 10, the terminal device 20, and the on-board device 30 may be performed by one piece of hardware, or may be performed by a plurality of pieces of hardware. Processing of each of the components of the server device 10, the terminal device 20, and the on-board device 30 may be implemented by one program, or may be implemented by a plurality of programs.

Figure 7:
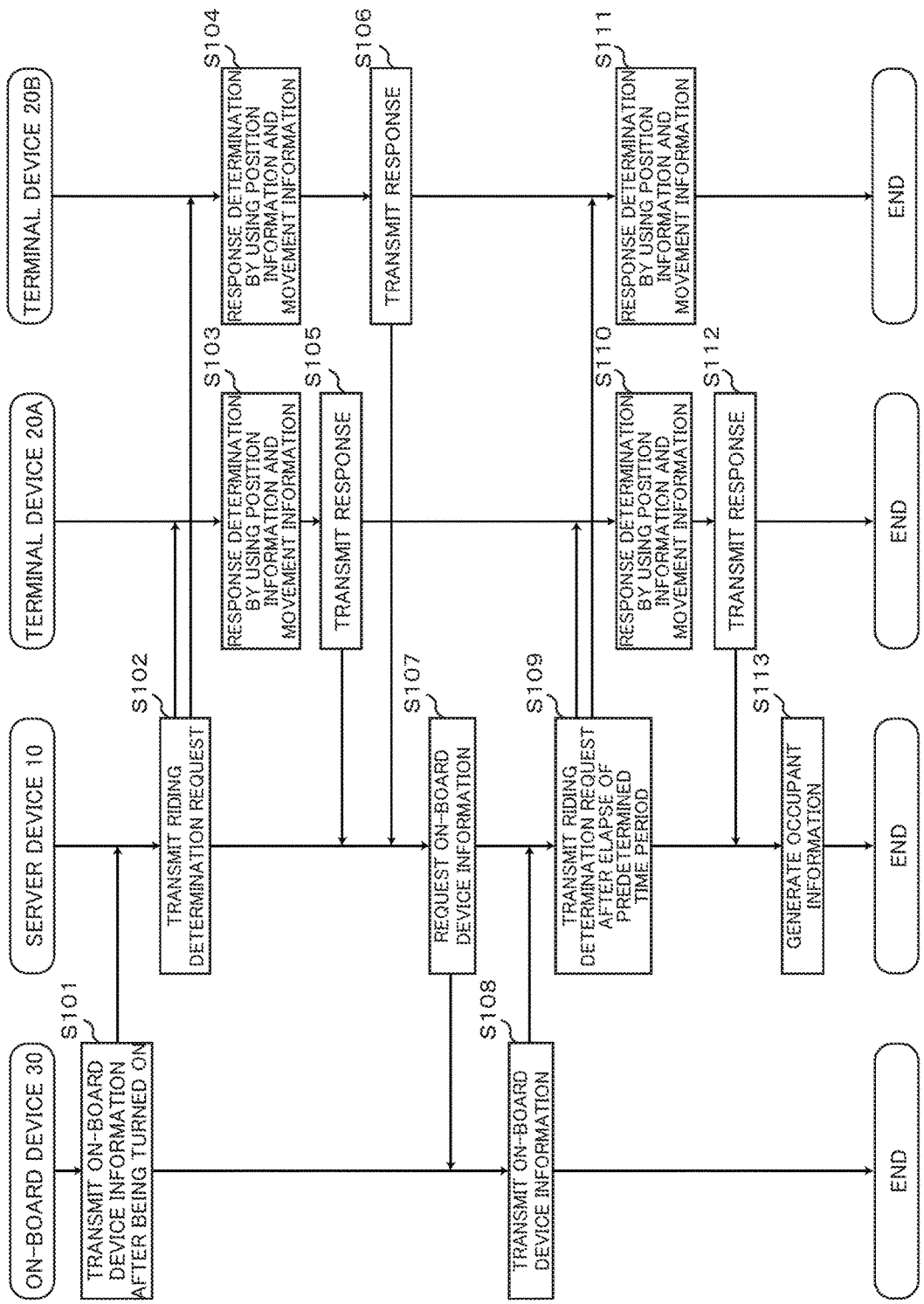
FIG. 7 is a sequence diagram illustrating an example of an outline of occupant determination processing of the occupant determination system according to the first embodiment.

FIG. 7 is a sequence diagram illustrating an example of an outline of occupant determination processing of the occupant determination system 1 according to the first embodiment. FIG. 7 illustrates an example of the occupant determination processing of a case where two terminal devices 20 to be provided with the vehicle management service, i.e., a terminal device 20A and a terminal device 20B, are present.

First, when the on-board device 30 is turned on, the communication unit 320 transmits on-board device information to the server device 10 (Step S101). Specifically, when the on-board device 30 is turned on, the on-board device side position identification unit 311 identifies the position of the on-board device 30. The communication unit 320 transmits the on-board device information and an on-board device identifier to the server device 10. The on-board device information includes the position information of the on-board device 30 identified by the on-board device side position identification unit 311, and determination time of the position information. The on-board device identifier is an identifier for identifying the on-board device.

Next, the terminal request unit 112 of the server device 10 transmits a riding determination request (Step S102). Specifically, the terminal request unit 112 generates information indicating a riding determination request, and including the identifier of the on-board device 30, the position information, and the determination time of the position information that are received from the on-board device 30. Then, the terminal request unit 112 transmits the generated information to the terminal device 20A and the terminal device 20B to be provided with the vehicle management service.

Next, in response to the riding determination request, the response determination unit 214 of the terminal device 20A performs response determination, by using the position information and movement information (Step S103). In the response determination, which will be described later in detail, the response determination unit 214 determines whether or not a distance between the terminal device 20 and the on-board device 30 is within a predetermined distance, and whether or not the terminal device 20 is moving at predetermined time. Note that, in the example illustrated in FIG. 7, both of the terminal device 20A and the terminal device 20B satisfy this condition at this time point.

Note that the predetermined time is specified by using the determination time of the position information of the on-board device 30. For example, the predetermined time is time that is a predetermined time period before (for example, five minutes before) the determination time. It is assumed that an occupant of a vehicle is moving immediately before the occupant gets on the vehicle or while the occupant is riding on the vehicle. Therefore, the response determination unit 214 considers that a possessor of the terminal device 20 that is present within a predetermined distance from the on-board device 30 and is moving at predetermined time is likely to be an occupant of the vehicle, and thus transmits a response to the server device 10.

Processing of Step S104 is similar to the processing of Step S103. Either of the processing of Step S103 or the processing of Step S104 may be performed first or later.

Next, the response determination unit 214 of the terminal device 20A transmits the response to the server device 10 (Step S105). The response includes a terminal identifier of the terminal device 20A, and the on-board device identifier of the on-board device 30. Processing of Step S106 is similar to the processing of Step S105.

Next, the on-board device information acquisition unit 111 of the server device 10 requests on-board device information from the on-board device 30 (Step S107). Specifically, when there are responses from a plurality of terminal devices 20 (in the case of this example, the terminal device 20A and the terminal device 20B), the server device 10 requests on-board device information from the on-board device 30 after the elapse of a predetermined time period since the server device 10 last received the on-board device information from the on-board device 30, for example.

Next, in response to the request made by the server device 10, the communication unit 320 of the on-board device 30 transmits on-board device information to the server device 10 (Step S108). This processing is similar to the processing performed in Step S101. In consequence, the on-board information acquisition unit of the server device 10 re-acquires on-board device information from the on-board device 30.

Next, the terminal request unit 112 of the server device 10 transmits a riding determination request to the terminal devices 20 after the elapse of a predetermined time period (Step S109). Specifically, the terminal request unit 112 generates information indicating a riding determination request, for the plurality of terminal devices 20 that transmitted the responses. The information indicating a riding determination request includes an identifier, position information, and movement information of the on-board device 30 that are re-acquired in Step S108. The terminal request unit 112 transmits the information indicating the riding determination request to the plurality of terminal devices 20 that transmitted the responses, after the elapse of a predetermined time period since the last riding determination request submitted in Step S102.

In the case illustrated in FIG. 7, in Step S105 and Step S106, the responses are received from two terminal devices 20, i.e., the terminal device 20A and the terminal device 20B. Therefore, the terminal request unit 112 transmits the riding determination request to the terminal device 20A and the terminal device 20B.

Processing performed in Step S110 and Step S111 is similar to the processing performed in Step S103 and Step S104. Therefore, description of the processing is omitted. Note that, in the example illustrated in FIG. 7, at the time point of determination in Step S110 and Step S111, the possessor of the terminal device 20A drives the vehicle including the on-board device 30, while the possessor of the terminal device 20B does not drive the vehicle nor ride on the vehicle. Therefore, at the determination in Step S111, the distance between the on-board device 30 and the terminal device 20B exceeds a predetermined distance, and thus does not satisfy the condition concerning the response determination.

Processing performed in Step S112 is similar to the processing performed in Step S105. Therefore, description of the processing is omitted. Note that, since the terminal device 20B does not satisfy the condition, the terminal device 20B does not transmit a response to the server device 10.

Next, the occupant determination unit 113 of the server device 10 generates occupant information 122 (Step S113). Specifically, the occupant determination unit 113 associates the on-board device identifier included in the on-board device information transmitted in Step S108, the terminal identifier of the terminal device 20A, and information indicating determination time that is included in the information received in Step S108 with each other to generate a record of occupant information 122. Further, the occupant determination unit 113 refers to terminal information 121 by using the terminal identifier of the terminal device 20A, and identifies its associated possessor information. The occupant determination unit 113 includes the identified possessor information in the record of the occupant information 122, and causes the storage unit 120 to store the record. After that, the on-board device 30, the server device 10, the terminal device 20A, and the terminal device 20B terminate the processing of this sequence diagram.

Figure 8:
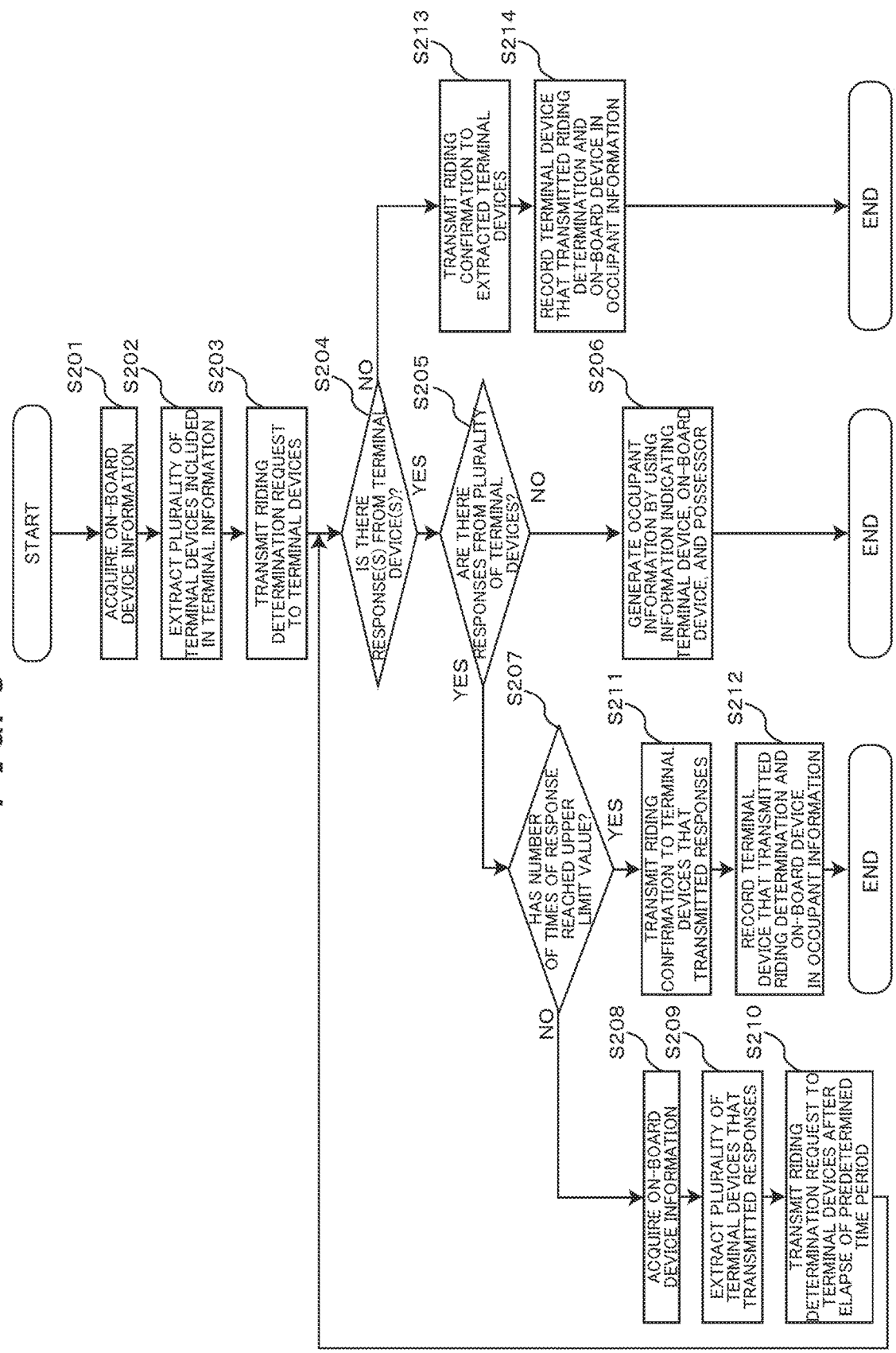
FIG. 8 is a flowchart illustrating an example of occupant determination processing of the server device according to the first embodiment.

FIG. 8 is a flowchart illustrating an example of occupant determination processing of the server device 10 according to the first embodiment. For example, this processing is regularly performed in the server device 10.

First, the on-board device information acquisition unit 111 acquires on-board device information (Step S201). Specifically, the on-board device information acquisition unit 111 receives information via the communication unit 130. The information is transmitted when the on-board device 30 is turned on, and includes position information of the on-board device 30, and determination time of the position information. Note that the information received in this step is similar to the information received in Step S101 illustrated in FIG. 7. Note that the on-board device information includes information indicating that the information is on-board device information transmitted at the time of turn on.

Next, the terminal request unit 112 extracts a plurality of terminal devices 20 included in terminal information 121 (Step S202). Specifically, when the terminal request unit 112 determines, with reference to the received on-board device information, that the received on-board device information is information transmitted at the time of turn on, the terminal request unit 112 extracts all terminal identifiers included in the terminal information 121, considering that the terminal identifiers represent the terminal devices 20 to be provided with the vehicle management service. Note that, when not all of the terminal identifiers included in the terminal information 121 are to be provided with the vehicle management service, the terminal request unit 112 extracts terminal identifiers to be provided with the service from the terminal information 121.

Next, the terminal request unit 112 transmits a riding determination request to the terminal devices 20 (Step S203). Specifically, the terminal request unit 112 generates information indicating a riding determination request. The information indicating a riding determination request includes information indicating an identifier, the position information, and the determination time included in the on-board device information acquired in Step S201. The terminal request unit 112 transmits the generated information indicating a riding determination request to the terminal devices 20 extracted in Step S202.

Next, the terminal request unit 112 determines whether or not there are one or more responses from one or more terminal devices 20 (Step S204).

When the terminal request unit 112 determines that there is at least one response from the terminal device 20 (in a case of "YES" in Step S204), the terminal request unit 112 determines whether or not there are responses from a plurality of terminal devices 20 (Step S205).

When the terminal request unit 112 determines that there are not responses from a plurality of terminal devices 20 (in a case of "NO" in Step S205), i.e., when there is a response from one terminal device 20, the occupant determination unit 113 generates occupant information 122 by using information indicating the terminal device 20, the on-board device 30, and a possessor (Step S206). Specifically, the occupant determination unit 113 associates the on-board device identifier related to the on-board device information acquired in Step S201, the terminal identifier of the terminal device 20 from which it is determined that a response is received in Step S204, and possessor information associated with the terminal identifier in the terminal information 121 with each other, to generate a record of occupant information 122, and causes the storage unit 120 to store the record. After that, the control unit 110 terminates the processing of this flowchart.

When the terminal request unit 112 determines that there are responses from a plurality of terminal devices 20 (in a case of "YES" in Step S205), the terminal request unit 112 determines whether or not the number of times of response has reached an upper limit value (Step S207). Specifically, the terminal request unit 112 determines whether or not the number of times of response received from the terminal devices 20 in Step S204 has reached a certain number of times that is determined in advance.

Note that the riding determination request(s) transmitted during single execution of the processing of Step S203 is regarded as a single riding determination request. Similarly, the riding determination request(s) transmitted during single execution of processing of Step S210 (described later) is regarded as a single riding determination request. As for response, response(s) made to a single riding determination request is regarded as a single response.

When the terminal request unit 112 determines that the number of times of response has not reached the upper limit value (in a case of "NO" in Step S207), the on-board device information acquisition unit 111 acquires the on-board device information (Step S208). Specifically, the on-board device information acquisition unit 111 requests the on-board device information from the on-board device 30. This processing is similar to the processing of Step S107 illustrated in FIG. 7. In consequence, the on-board device information acquisition unit 111 acquires the on-board device information from the on-board device 30. This processing is similar to the processing performed in Step S108 of FIG. 7.

Next, the terminal request unit 112 extracts a plurality of terminal devices 20 that transmitted the responses (Step S209). Specifically, the terminal request unit 112 extracts a plurality of terminal devices 20 that are senders of the responses determined to be received in Step S204. Note that, when there are responses received a plurality of number of times, the plurality of terminal devices 20 that are the senders of the responses received at the latest timing are extracted.

Next, the terminal request unit 112 transmits a riding determination request to the terminal devices 20 after the elapse of a predetermined time period (Step S210). Specifically, the terminal request unit 112 transmits a riding determination request to each of the plurality of terminal devices 20 extracted in Step S209, after the elapse of a predetermined time period since the last riding determination request. After that, the terminal request unit 112 proceeds the processing to Step S204.

Note that, in this embodiment, the terminal request unit 112 transmits the riding determination request again after the elapse of a predetermined time period since the transmission of the last riding determination request. However, the timing at which the riding determination request is transmitted again is not limited to the timing above. For example, the riding determination request may be submitted again after the elapse of a predetermined time period since the reception of the responses from the terminal devices 20.

In Step S207, when the terminal request unit 112 determines that the number of times of response has reached the upper limit value (in a case of "YES" in Step S207), the terminal request unit 112 transmits riding confirmation to the terminal devices 20 that transmitted the responses (Step S211). Specifically, the terminal request unit 112 extracts the plurality of terminal devices 20 that transmitted the responses in Step S205. The terminal request unit 112 transmits information indicating riding confirmation to the extracted terminal devices 20. The information indicating riding confirmation is information for requesting a selection as to whether or not a possessor of each of the extracted terminal devices 20 is operating a vehicle including the on-board device 30 that is identified in the riding determination request.

In consequence, the terminal request unit 112 receives a response indicating either that the possessor of the terminal device 20 is operating the vehicle, or is not operating the vehicle. From each of the plurality of terminal devices 20 that transmitted the responses.

Next, the occupant determination unit 113 records a terminal device 20 that transmitted riding determination and the on-board device 30 in occupant information 122 (Step S212). Specifically, the occupant determination unit 113 associates a terminal device 20 that transmitted a response indicating that a possessor of the terminal device 20 is riding on a vehicle in a response to the riding confirmation transmitted to the plurality of terminal devices 20 in Step S211, and the on-board device 30 related to the riding determination request with each other, to generate a record of occupant information 122. The occupant determination unit 113 refers to terminal information 121 by using a terminal identifier for identifying the terminal device 20, identifies the possessor of the terminal device 20, and includes the possessor information in the record of the occupant information 122. After that, the control unit 110 terminates the processing of this flowchart.

When the terminal request unit 112 determines that there are no responses from the terminal devices 20 in Step S204 (in a case of "NO" in Step S204), the terminal request unit 112 transmits riding confirmation to the extracted terminal devices 20 (Step S213). Specifically, the terminal request unit 112 transmits information indicating riding confirmation to the terminal devices 20 extracted in Step S202 or Step S209. The information indicating riding confirmation is information for requesting a selection as to whether or not a possessor of each of the extracted terminal devices 20 is operating a vehicle including the on-board device 30 that is identified in the riding determination request. In consequence, the terminal request unit 112 receives a response indicating either that the possessor of the terminal device 20 is operating the vehicle, or is not operating the vehicle, from each of the plurality of terminal devices 20 that transmitted the responses.

After that, processing performed in Step S214 is similar to the processing performed in Step S212. Therefore, description of the processing is omitted. After that, the control unit 110 terminates the processing of this flowchart.

As described above, according to this embodiment, a driver can be efficiently associated with a vehicle, and can be managed. According to this embodiment, also when a vehicle is shared by a plurality of people, or when the terminal device 20 is shared by a plurality of people, a driver of the vehicle can be appropriately managed.

Particularly, in this embodiment, when information of a driver and a vehicle are managed, the terminal device 20 and the on-board device 30 can be associated without directly connecting the terminal device 20 and the on-board device 30 to each other. Consequently, a load of processing required for establishing connection between the terminal device 20 and the on-board device 30 can be reduced.

Note that, in this embodiment, as described above, even when the distance between the terminal device 20 and the on-board device 30 exceeds a predetermined distance or when it is not determined that the terminal device 20 is moving, the response determination unit 214 may transmit a response to the server device 10. In such a case, the terminal request unit 112 receives responses from all of the terminal devices 20 to which the riding determination request is transmitted.

In such a case, in Step S204 of FIG. 8, the terminal request unit 112 refers to one or more responses transmitted from one or more terminal devices 20, and determines whether or not a condition is satisfied. The condition is that the distance between the terminal device 20 and the on-board device 30 is within a predetermined distance, and that the terminal device 20 is moving. When at least one terminal device 20 satisfies the condition, the terminal request unit 112 proceeds the processing to Step S205. When none of the terminal devices 20 satisfies the condition, the terminal request unit 112 proceeds the processing to Step S213.

Further, in such a case, in Step S205, when there are a plurality of terminal devices 20 that satisfy the condition, the terminal request unit 112 proceeds the processing to Step S207. When there is one terminal device 20 that satisfies the condition, the terminal request unit 112 proceeds the processing to Step S206.

In this embodiment, to manage a driver, one terminal device 20 is associated with one on-board device 30 to generate the riding information. However, a plurality of occupants may be associated with one on-board device 30.

In such a case, in the occupant determination processing, an upper limit of the number of terminal devices 20 (occupants) to be associated with one on-board device 30 is predetermined. In Step S205 illustrated in FIG. 8, the terminal request unit 112 proceeds the processing to Step S207 when the number of terminal devices 20 that transmitted responses exceeds the upper limit, and proceeds the processing to Step S206 when the number is equal to or less than the upper limit.

Further, the riding confirmation transmitted in Step S211 and Step S213 is information for prompting a selection as to whether or not a possessor of each of the terminal devices 20 is riding on a vehicle including the on-board device 30. In Step S212 or Step S214, when the number of terminal devices 20 from which selections each indicating riding on a vehicle are received is equal to or less than the upper limit, the occupant determination unit 113 associates all of the terminal devices 20 from which the above-mentioned selections are received with the on-board device identifier.

Consequently, in the occupant determination system 1, a vehicle and one or more occupants can be efficiently managed.

Figure 9:
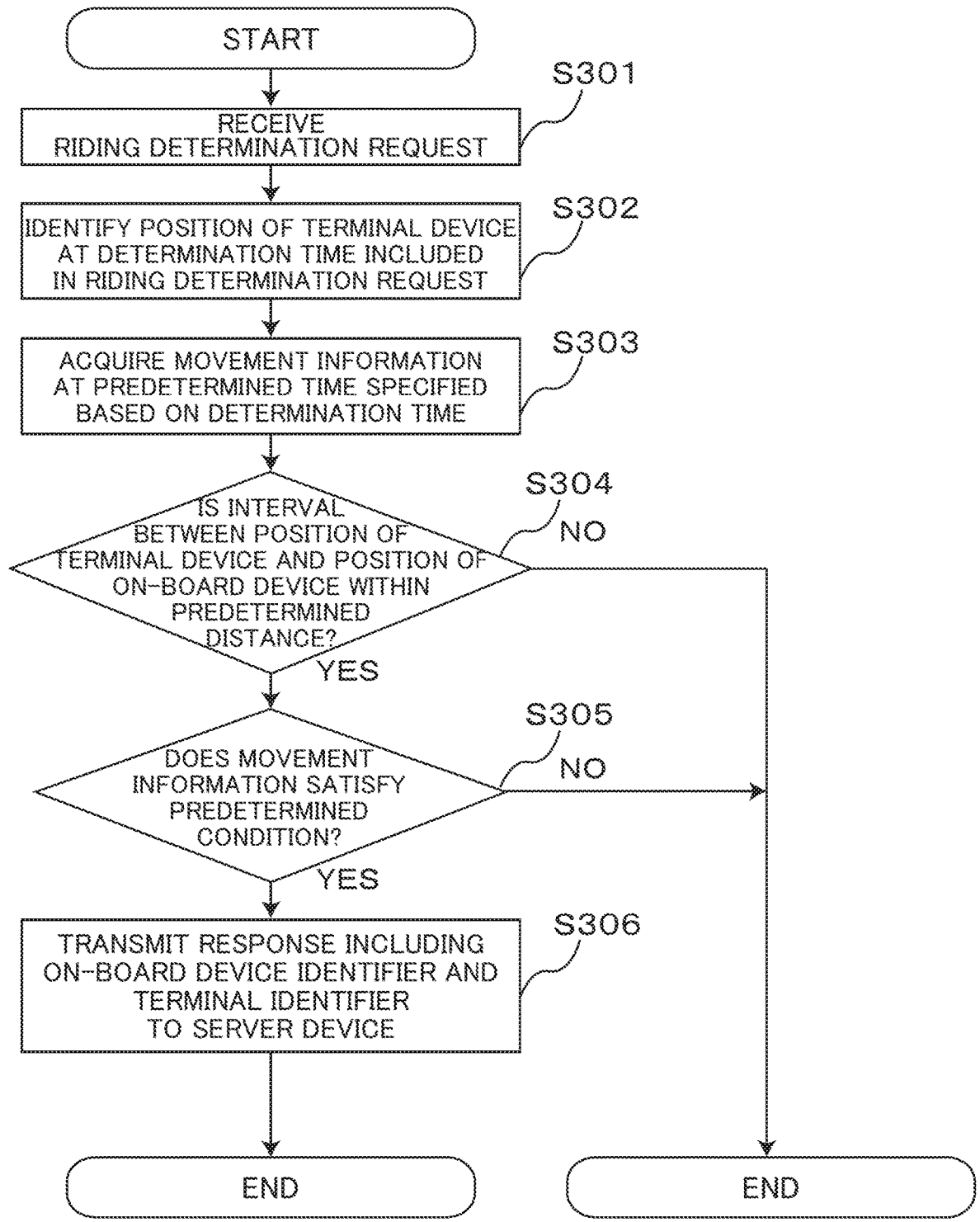
FIG. 9 is a flowchart illustrating an example of response generation processing of the terminal device according to the first embodiment.

FIG. 9 is a flowchart illustrating an example of response generation processing of the terminal device 20 according to the first embodiment. For example, this processing is regularly performed in the terminal device 20.

First, the communication unit 220 receives a riding determination request from the server device 10 (Step S301). As described above, the riding determination request includes an identifier of the on-board device 30, position information of the on-board device 30, and determination time of the position information.

Next, the terminal side position identification unit 211 identifies the position of the terminal device 20 at the determination time included in the riding determination request (Step S302). Specifically, the terminal device 20 stores a history of information indicating the position of the terminal device 20 in a storage area (not illustrated) for a certain period of time. The terminal side position identification unit 211 refers to the storage area by using the determination time, and determines information indicating the position of the terminal device 20 at the determination time.

Next, the movement information acquisition unit 213 acquires movement information at predetermined time that is specified based on the determination time (Step S303). Specifically, the terminal device 20 stores a history of movement information of the terminal device 20 in a storage area (not illustrated) for a certain period of time. For example, the movement information acquisition unit 213 specifies, as the predetermined time, the timing a predetermined time period before (for example, five minutes before) the determination time. The movement information acquisition unit 213 refers to the storage area, and acquires movement information at the time. Note that it is sufficient that the predetermined time may be specified based on the determination time. For example, the determination time may be the determination time itself. Further, as described above, for example, the movement information is acceleration information.

Next, the response determination unit 214 determines whether or not an interval between the position of the terminal device 20 and the position of the on-board device 30 is within a predetermined distance (Step S304). Specifically, the distance measurement unit 212 measures an interval between the position of the terminal device 20 and the position of the on-board device 30, by using the position of the on-board device 30 included in the riding determination request received in Step S301 and the position of the terminal device 20 identified in Step S303.

The response determination unit 214 determines whether or not the measured interval is within a predetermined distance (first response determination). When the response determination unit 214 determines that the measured interval is not within the predetermined distance (in a case of "NO" in Step S304), the control unit 210 terminates the processing of this flowchart.

When the response determination unit 214 determines that the measured interval is within the predetermined distance (in a case of "YES" in Step S304), the response determination unit 214 determines whether or not the movement information satisfies a predetermined condition (Step S305). Specifically, the response determination unit 214 performs determination with reference to the movement information acquired in Step S303 (second response determination). When the response determination unit 214 determines that the movement information does not satisfy the predetermined condition (in a case of "NO" in Step S305), the control unit 210 considers that the terminal device 20 is not moving at the predetermined time, and thus terminates the processing of this flowchart.

Note that it is sufficient that the predetermined condition is one by which moving/non-moving of the terminal device 20 at the predetermined time can be determined. As one example, the movement information is a value indicating acceleration at the predetermined time, and the predetermined condition is a threshold value of the acceleration. When the acceleration exceeds the threshold value, the response determination unit 214 determines that the terminal device 20 was moving.

Further, in another example, the movement information is angular velocity at the predetermined time. When the angular velocity exceeds a threshold value, the response determination unit 214 determines that the terminal device 20 was moving.

Further, in another example, the movement information is a value indicating acceleration in a predetermined period of time that is determined based on the predetermined time. When there is at least one value of acceleration exceeding the threshold value among values of acceleration measured in the predetermined period of time, the response determination unit 214 determines that the terminal device 20 was moving. Alternatively, when a pattern of a change of the acceleration measured in the predetermined period of time is similar to a predetermined pattern, the response determination unit 214 determines that the terminal device 20 was moving.

When the response determination unit 214 determines that the movement information satisfies the predetermined condition (in a case of "YES" in Step S305), the response determination unit 214 transmits a response including an on-board device identifier and a terminal identifier to the server device 10 (Step S306). Specifically, the response determination unit 214 generates information including an identifier of the terminal device 20 and the on-board device identifier included in the riding determination request received in Step S301, and transmits the information to the server device 10 as a response to the riding determination request. After that, the control unit 210 terminates the processing of this flowchart.

Note that, in Step S304 and Step S305, the response determination unit 214 determines whether or not a condition is satisfied. The condition is that the distance between the terminal device 20 and the on-board device 30 is within a predetermined distance, and that the terminal device 20 is moving. After that, when the condition is satisfied, the response determination unit 214 transmits a response to the server device 10. As described above, even when the condition is not satisfied, the response determination unit 214 may transmit a response to the server device 10.

In such a case, in Step S306, the response determination unit 214 includes information indicating that the condition is satisfied in a response, and transmits the response. Further, in a case of "NO" in Step S304 and in a case of "NO" in Step S305, the response determination unit 214 generates a response including information indicating that the condition is not satisfied, and transmits the response to the server device 10.

As described above, in this embodiment, determining the distance between the terminal device 20 and the on-board device 30 and moving/non-moving by the terminal device 20 allows an appropriate support for the occupant determination processing performed by the server device 10. Consequently, management of a vehicle and an occupant can be efficiently performed.

Note that, in this embodiment, the response determination unit 214 determines moving/non-moving by using movement information acquired using the motion sensor 259. However, the movement information is not limited to information acquired using the motion sensor 259. For example, the movement information acquisition unit 213 may regularly acquire the position (for example, coordinate information) of the terminal device 20 by using the positioning signal reception device 254, and cause a storage area (not illustrated) to store a history of position information of a certain period of time.

In such a case, the response determination unit 214 refers to the storage area when the response determination unit 214 determines moving/non-moving of the terminal device 20 in Step S305. When the position of the terminal device 20 has moved in a predetermined period of time specified based on the predetermined time, the response determination unit 214 determines that the terminal device 20 has moved.

Second Embodiment

Next, the occupant determination system 1 according to a second embodiment will be described. In the first embodiment, the terminal device 20 performs response determination as to whether or not the terminal device 20 satisfies a condition. In the second embodiment, the server device 10 performs the determination. Differences from the first embodiment will be described below.

Figure 10:
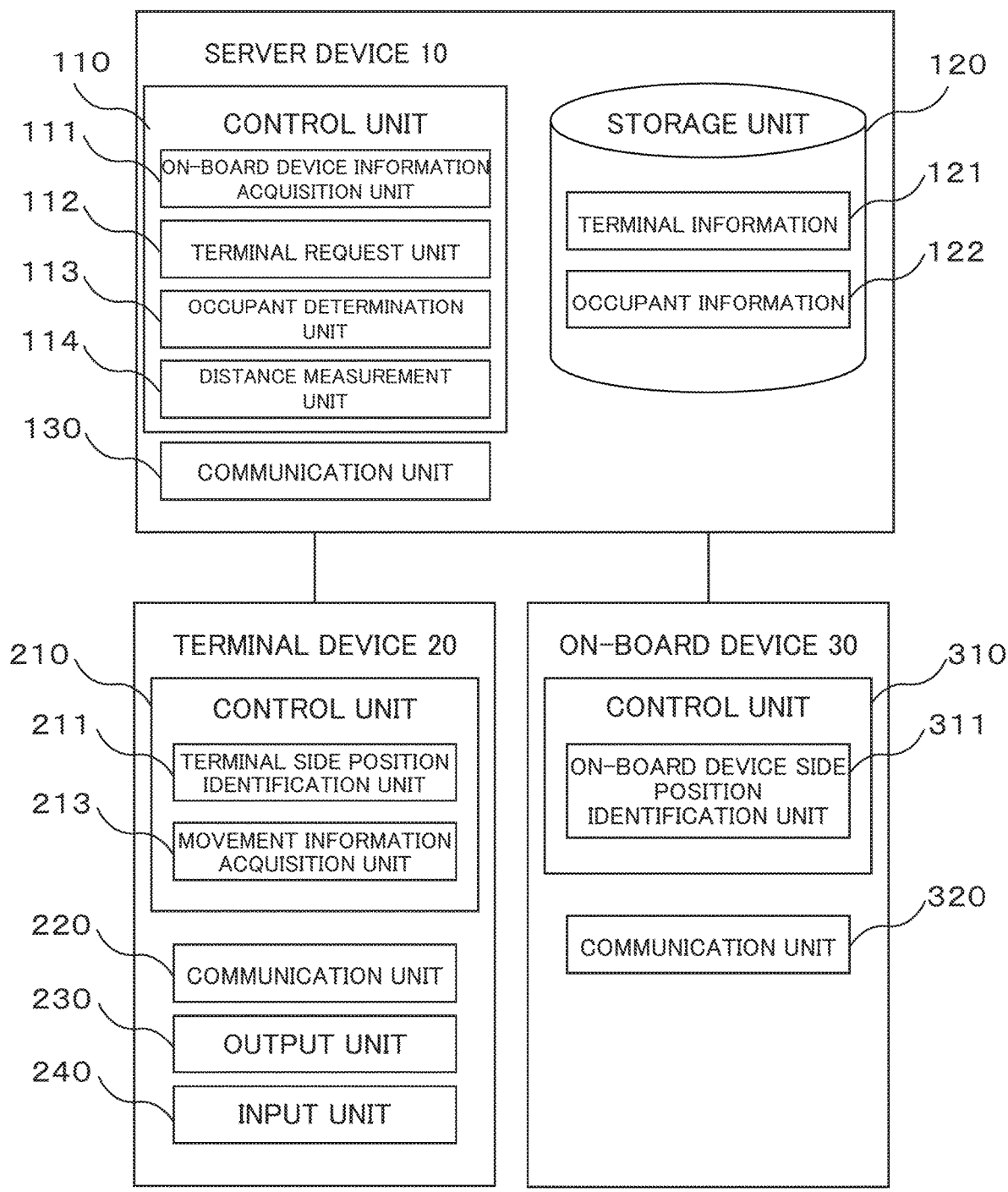
FIG. 10 is a diagram illustrating an example of a functional block configuration of the occupant determination system according to a second embodiment.

FIG. 10 is a diagram illustrating an example of a functional block configuration of the occupant determination system 1 according to the second embodiment. The control unit 110 of the server device 10 according to this embodiment includes a distance measurement unit 114, as well as the on-board device information acquisition unit 111, the terminal request unit 112, and the occupant determination unit 113.

The terminal request unit 112 according to this embodiment acquires movement information and position information of the terminal device 20, as a response to an occupant determination request. The distance measurement unit 114 measures a distance between the on-board device 30 and the terminal device 20, by using position information of the on-board device 30 included in on-board device information and the position information of the terminal device 20.

Further, the control unit 210 of the terminal device 20 according to this embodiment does not include the distance measurement unit 212 and the response determination unit 214, which are included in the first embodiment. Note that, when the control unit 210 according to the second embodiment receives a riding determination request from the server device 10, the control unit 210 generates a response including position information and movement information of the terminal device 20 at determination time, and transmits the response to the server device 10.

Figure 11:
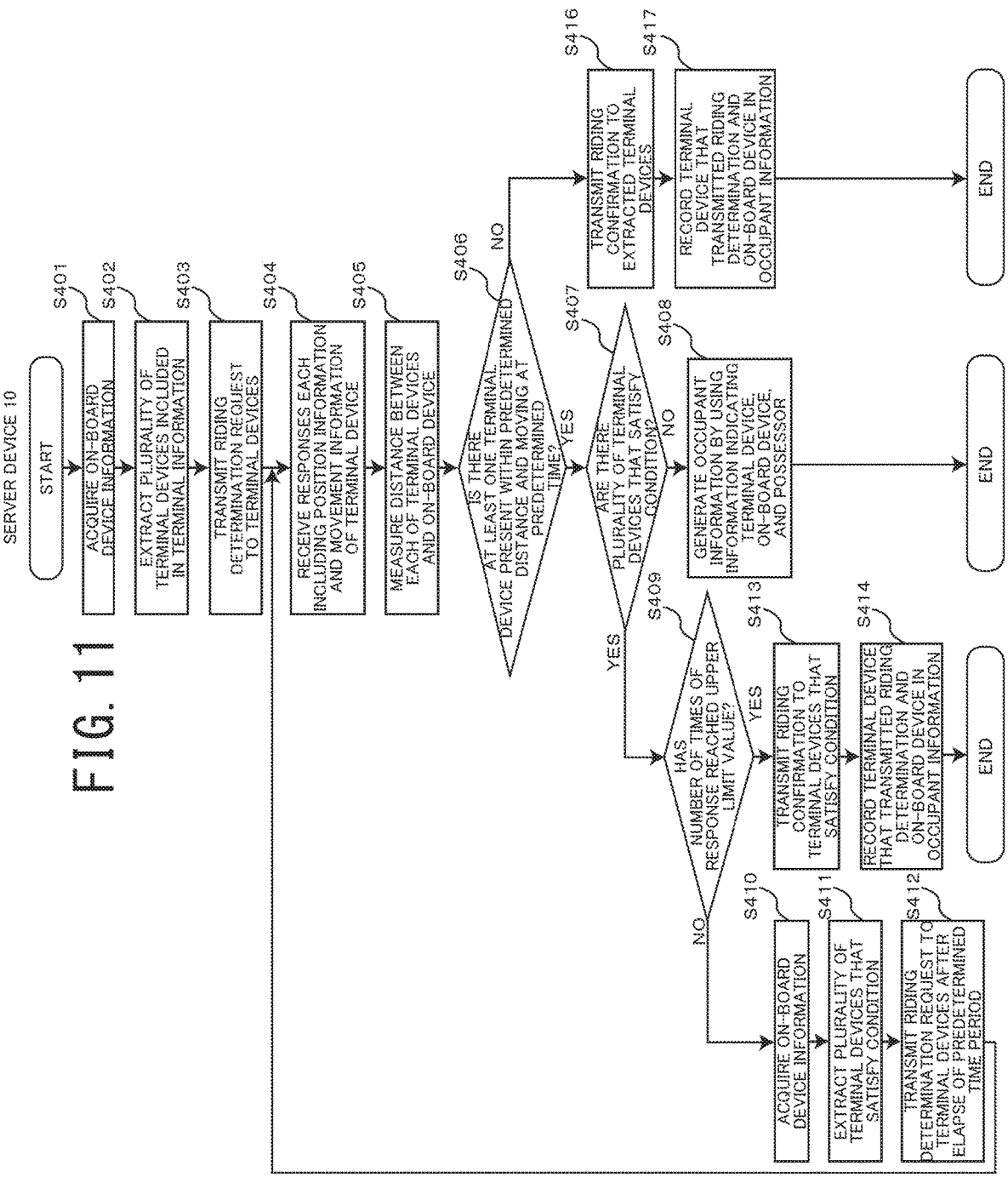
FIG. 11 is a flowchart illustrating an example of occupant determination processing of the server device according to the second embodiment.

FIG. 11 is a flowchart illustrating an example of occupant determination processing of the server device 10 according to the second embodiment. Processing performed from Step S401 to Step S403 is similar to the processing performed from Step S201 to Step S203 of FIG. 8. Therefore, description of the processing is omitted.

Next, the terminal request unit 112 receives responses, each including position information and movement information of the terminal device 20 (Step S404). Specifically, as responses to the riding determination request transmitted to the terminal devices 20 in Step S403 or Step S412 (described later), the terminal request unit 112 receives responses, each including position information of the terminal device 20 at determination time, and movement information of the terminal device 20 at predetermined time that is specified based on the determination time.

Next, the distance measurement unit 114 measures a distance between each of the terminal devices 20 and the on-board device 30 (Step S405). Specifically, the distance measurement unit 114 measures a distance between each of the terminal devices 20 and the on-board device 30, by using position information of the on-board device 30 included in the on-board device information acquired in Step S401 or Step S410 (described later), and the position information of the terminal device 20 included in the response received in Step S404.

Next, the terminal request unit 112 determines whether or not there is at least one terminal device 20 that is present within a predetermined distance and that is moving at predetermined time (Step S406). Specifically, when a distance between one of terminal devices 20 and the on-board device 30 measured in Step S405 is within the predetermined distance, and when the movement information of the terminal device 20 at the predetermined time acquired in Step S404 is information indicating that the terminal device 20 is moving, the terminal request unit 112 determines that the terminal device 20 satisfies the condition. When the terminal request unit 112 determines that there is at least one terminal device 20 that satisfies the condition, the terminal request unit 112 proceeds the processing to Step S407. When the terminal request unit 112 determines that there are no terminal devices 20 that satisfy the condition, the terminal request unit 112 proceeds the processing to Step S416.

When the terminal request unit 112 determines that there is at least one terminal device 20 that satisfies the condition (in a case of "YES" in Step S406), i.e., determines that there is at least one terminal device 20 that satisfies a condition that the distance between the terminal device 20 and the on-board device 30 is within the predetermined distance and the terminal device 20 is moving at the predetermined time, the terminal request unit 112 determines whether or not there are a plurality of terminal devices 20 that satisfy the condition (Step S407).

When the terminal request unit 112 determines that there are not a plurality of terminal devices 20 that satisfy the condition (in a case of "NO" in Step S407), the terminal request unit 112 performs processing of Step S408. Processing of Step S408 is similar to the processing performed in Step S206 of FIG. 8. Therefore, description of the processing is omitted.

When the terminal request unit 112 determines that there are a plurality of terminal devices 20 that satisfy the condition (in a case of "YES" in Step S407), the terminal request unit 112 performs processing of Step S409. Processing of Step S409 and Step S410 is similar to the processing performed in Step S207 and Step S208 of FIG. 8. Therefore, description of the processing is omitted.

After the processing of Step S410, the terminal request unit 112 extracts a plurality of terminal devices 20 that satisfy the condition (Step S411). Specifically, the terminal request unit 112 extracts terminal identifiers of the plurality of terminal devices 20 that are determined to satisfy the condition in Step S407. Processing performed in Step S412 after the extraction is similar to the processing performed in Step S210 of FIG. 8. Therefore, description of the processing is omitted.

In Step S409, when the terminal request unit 112 determines that the number of times of response has reached an upper limit value (in a case of "YES" in Step S409), the terminal request unit 112 transmits riding confirmation to the terminal devices 20 that satisfy the condition (Step S413). Specifically, the terminal request unit 112 transmits information indicating riding confirmation to the plurality of terminal devices 20 that are determined to satisfy the condition in Step S407. Processing performed in Step S414 after the transmission is similar to the processing performed in Step S212 of FIG. 8.

In Step S406, when the terminal request unit 112 determines that there are no terminal devices 20 that are present within the predetermined distance and that are moving at the predetermined time (in a case of "NO" in Step S406), the terminal request unit 112 performs processing of Step S416. Processing of Step S416 and Step S417 is similar to the processing of Step S213 and Step S214 of FIG. 8. Therefore, description of the processing is omitted.

According to this embodiment, when an occupant of a vehicle is determined, the server device 10 can determine whether or not a condition is satisfied. Therefore, a load of processing of the terminal device 20 is reduced.

In the above, each of the embodiments and modifications according to the present invention is described. The present invention is not limited to the examples of the embodiments described above, and encompasses various modifications. For example, the examples of the embodiments described above are described in detail for the sake of better understanding of the present invention, and the present invention is not limited to including all the configurations described herein. A part of a configuration of one example of one embodiment can be replaced with a configuration of another example. A configuration of another example can be added to a configuration of one example of one embodiment. Another configuration can be added to, deleted from, and replaced with a part of a configuration of one example of each embodiment. A part or all of each configuration, function, processing unit, processing means, and the like. Described above may be designed in an integrated circuit to be implemented as hardware, for example. Control lines and information lines illustrated in the drawings are those considered necessary for the sake of description, and do not represent all control lines and information lines. It may be considered that almost all of the configurations are connected to each other.

The functional configurations of the server device 10, the terminal device 20, and the on-board device 30 described above are classified according to main details of their processing, for the sake of easier understanding. How the components are classified and referred to do not limit the invention of the present application. The configurations of the server device 10, the terminal device 20, and the on-board device 30 can be further classified to have more components, according to the details of their processing. The components can be classified so that one component performs more processing.

What is claimed is:

1. A server device comprising:
an on-board device information acquisition unit configured to acquire position information from an on-board device;
a terminal request unit configured to transmit, to a plurality of predetermined terminal devices, information indicating a riding determination request including the position information of the on-board device; and
an occupant determination unit configured to associate at least one terminal device out of the plurality of predetermined terminal devices and the on-board device with each other, based on a response from the terminal device that is present within a predetermined distance from the on-board device, and to generate occupant information including time, an on-board device identifier, a terminal identifier, and possessor information, the possessor information identifying a possessor of the terminal device.

2. The server device according to claim 1, wherein
the on-board device information acquisition unit acquires information indicating determination time of the position information of the on-board device,
the terminal request unit transmits information indicating the riding determination request including the determination time, and
when the occupant determination unit receives the response from the terminal device that is present within a predetermined distance from the on-board device and that is moving at predetermined time specified by using the determination time, the occupant determination unit associates the terminal device that transmitted the response and the on-board device.

3. The server device according to claim 1, wherein
when the occupant determination unit receives responses from the plurality of terminal devices out of the plurality of predetermined terminal devices, the on-board device information acquisition unit re-acquires the position information from the on-board device,
the terminal request unit transmits, to the plurality of terminal devices that transmitted the responses, information indicating the riding determination request including the re-acquired position information, and
when the occupant determination unit receives a response from one terminal device out of the plurality of terminal devices, the occupant determination unit associates the terminal device and the on-board device with each other.

4. The server device according to claim 3, wherein
the on-board device information acquisition unit acquires information indicating determination time of the position information of the on-board device,
the terminal request unit transmits information indicating the riding determination request including the determination time, and the occupant determination unit receives the response from the terminal device, the terminal device being present within a predetermined distance from the on-board device and being moving at predetermined time specified by using the determination time.

5. The server device according to claim 3, wherein
when the occupant determination unit receives responses a predetermined number of times from the plurality of terminal devices out of the plurality of predetermined terminal devices, the terminal request unit transmits information indicating riding confirmation to the plurality of terminal devices that transmitted the responses to the riding determination request submitted at latest timing, and
the occupant determination unit associates at least one terminal device out of the plurality of terminal devices and the on-board device with each other, based on a response to the riding confirmation.

6. The server device according to claim 3, wherein
when the occupant determination unit receives the responses from the plurality of terminal devices, the terminal request unit transmits information indicating the riding determination request again, after elapse of a predetermined time period since the riding determination request.

7. The server device according to claim 1, further comprising
a server side distance determination unit configured to determine, when position information of at least one terminal device out of the plurality of predetermined terminal devices is acquired as a response to the riding determination request, whether or not a distance between the terminal device and the on-board device is within the predetermined distance.

8. The server device according to claim 1, wherein the terminal device determines whether the terminal device is moving.

9. An occupant determination method performed by a server device, the server device including an on-board device information acquisition unit, a terminal request unit, and an occupant determination unit, the occupant determination method comprising:
acquiring position information of an on-board device in an on-board device information acquisition procedure by the on-board device information acquisition unit;
transmitting to a plurality of predetermined terminal devices, information indicating a riding determination request including the position information of the on-board device in a terminal request procedure by the on-board device information acquisition unit;
associating the terminal device and the on-board device with each other when the occupant determination unit receives a response from at least one terminal device out of the plurality of predetermined terminal devices that is present within a predetermined distance from the on-board device in an occupant determination procedure by the occupant determination unit; and
generating occupant information including time, an on-board device identifier, a terminal identifier, and possessor information, the possessor information identifying a possessor of the terminal device.

10. The occupant determination method according to claim 9, further comprising:
acquiring information indicating determination time of the position information of the on-board device in the on-board device information acquisition procedure;
transmitting information indicating the riding determination request including the determination time in the terminal request procedure; and
associating the terminal device that transmitted the response and the on-board device each other in the occupant determination procedure, when the occupant determination unit receives the response from the terminal device that is present within a predetermined distance from the on-board device and that is moving at predetermined time specified by using the determination time.

11. The occupant determination method according to claim 9, comprising:
re-acquiring the position information from the on-board device in the on-board device information acquisition procedure, when responses are received from the plurality of predetermined terminal devices in the occupant determination procedure,
transmitting information indicating the riding determination request including the re-acquired position information to the plurality of terminal devices that transmitted the responses in the terminal request procedure, and
associating the terminal device and the on-board device with each other in the occupant determination procedure when a response is received from one terminal device out of the plurality of terminal devices.

12. The occupant determination method according to claim 11, comprising:
acquiring information indicating determination time of the position information of the on-board device in the on-board device information acquisition procedure,
transmitting information indicating the riding determination request including the determination time in the terminal request procedure, and
receiving the response from the terminal device, the terminal device being present within a predetermined distance from the on-board device and being moving at predetermined time specified by using the determination time in the occupant determination procedure.

13. The occupant determination method according to claim 11, comprising:
transmitting information indicating riding confirmation to the plurality of terminal devices that transmitted the responses to the riding determination request submitted at latest timing in the terminal request procedure when responses are received a predetermined number of times from the plurality of terminal devices out of the plurality of predetermined terminal devices, and
associating at least one terminal device out of the plurality of terminal devices and the on-board device based on a response to the riding confirmation in the occupant determination procedure.

14. The occupant determination method according to claim 11, comprising:
transmitting information indicating the riding determination request again, after elapse of a predetermined time period since the riding determination request in the terminal request procedure when the responses are received from the plurality of terminal devices in the occupant determination procedure.

15. The occupant determination method according to claim 9, comprising:
the server device further includes a server side distance determination unit, and
determining whether or not a distance between the terminal device and the on-board device is within the predetermined distance when position information of at least one terminal device out of the plurality of predetermined terminal devices is acquired as a response to the riding determination request in a server side distance determination procedure by the server side distance determination unit.

16. An occupant determination support method performed by a terminal device, the terminal device including a position identification unit, a response determination unit, and a communication unit, the position identification unit performs a position identification procedure of identifying a position of the terminal device at a determination time included in a riding determination request, and acquiring movement information at a predetermined time specified based on the determination time;

when the response determination unit receives information indicating the riding determination request including position information of an on-board device from a server device, the response determination unit performs a response determination procedure of determining whether or not an interval between the position of the terminal device and a position of the on-board device is within a predetermined distance, and determining whether the movement information satisfies a predetermined condition; and when the response determination unit determines that the interval is within the predetermined distance, the communication unit performs a communication procedure of transmitting a response to the server device.

17. A terminal device comprising:

a position identification unit configured to perform a position identification procedure of identifying a position of the terminal device at a determination time included in a riding determination request and to acquire movement information at a predetermined time specified based on the determination time;

a response determination unit configured to receive information indicating the riding determination request including position information of an on-board device from a server device, perform a response determination procedure of determining whether or not an interval between the position of the terminal device and a position of the on-board device is within a predetermined distance, and determine whether the movement information satisfies a predetermined condition; and a communication unit configured to perform a communication procedure of transmitting a response to the server device when the response determination unit determines that the interval is within the predetermined distance.

* * * * *